United States Patent [19]

Kato

[11] Patent Number: 4,722,833

[45] Date of Patent: Feb. 2, 1988

[54] FINE COAGULATED PARTICLES OF ULTRAFINE MONOCLINIC ZIRCONIA CRYSTALS ORIENTED IN A FIBER BUNDLE-LIKE FORM AND METHOD OF MANUFACTURING THEM

[75] Inventor: Etsuro Kato, Aichi, Japan

[73] Assignee: Nissan Chemical Industries, Ltd., Tokyo, Japan

[21] Appl. No.: 939,961

[22] Filed: Dec. 10, 1986

[30] Foreign Application Priority Data

Dec. 10, 1985 [JP] Japan .................... 60-278528

[51] Int. Cl.$^4$ .............................. C03C 3/06
[52] U.S. Cl. ...................... 423/608; 501/95; 501/103
[58] Field of Search ............ 501/103, 95; 423/81, 423/82, 84, 608

[56] References Cited

U.S. PATENT DOCUMENTS

| | | |
|---|---|---|
| 2,984,576 | 5/1961 | Alexander et al. .............. 501/103 |
| 2,984,628 | 5/1961 | Alexander et al. .............. 501/103 |
| 3,110,681 | 11/1963 | Meadows et al. ............... 501/103 |
| 3,259,585 | 7/1966 | Fitch et al. .................. 501/103 |
| 3,282,857 | 11/1966 | Fitch et al. .................. 252/313.1 |
| 3,340,006 | 9/1967 | Mochel . | |
| 3,442,817 | 5/1969 | Luebke ....................... 252/313.1 |
| 3,645,910 | 2/1972 | Woodhead ..................... 252/313.1 |
| 4,283,377 | 8/1981 | Fenner ........................ 423/419 |
| 4,543,341 | 9/1985 | Barringer et al. ............. 501/103 |
| 4,619,817 | 10/1986 | Stambaugh et al. ............. 423/608 |
| 4,664,894 | 5/1987 | Suzuki et al. ................ 423/608 |

FOREIGN PATENT DOCUMENTS

| | | |
|---|---|---|
| 39-27308 | 11/1964 | Japan . |
| 58-79818 | 5/1983 | Japan . |
| 60-36330 | 2/1985 | Japan . |
| 60-180917 | 9/1985 | Japan . |
| 61-201622 | 9/1986 | Japan . |
| 550288 | 1/1943 | United Kingdom . |
| 867880 | 10/1981 | U.S.S.R. . |

Primary Examiner—William R. Dixon, Jr.
Assistant Examiner—David M. Brunsman
Attorney, Agent, or Firm—Birch, Stewart, Kolasch & Birch

[57] ABSTRACT

Coagulated particles of ultrafine monoclinic zicronia crystals oriented in fiber bundle-like form, wherein primary particles of ultrafine monoclinic zirconia are oriented to join and extended in the direction of C-axis into fine fibrous form of less than 50 Å diameter and they are further gathered into a bundle-like form having from 300 to 2000 Å of width and from 2000 to 10000 Å of length. Such particles are prepared by hydrothermal processing which is applied at a temperature from 120° to 300° C. to an acidic aqueous solution containing a water-soluble zirconium compound in an amount of from 0.1 to 2.0 mol/l as Zr, $SO_4{}^{2-}$ in an amount of from 0.2 to 2.0 mol/l and a water-soluble compound selected from the group consisting of water-soluble magnesium compounds, water-soluble ammonium compounds and mixtures thereof in an amount of from 0.05 to 1.5 mol/l as $Mg^{2+}$ or $NH_4$.

2 Claims, 2 Drawing Figures

FINE COAGULATED PARTICLES OF ULTRAFINE MONOCLINIC ZIRCONIA CRYSTALS ORIENTED IN A FIBER BUNDLE-LIKE FORM AND METHOD OF MANUFACTURING THEM

BACKGROUND OF THE INVENTION

This invention concerns fine coagulated particles of ultrafine monoclinic zirconia crystals oriented in a fiber bundle-like form and a method of manufacturing them. More specifically, it relates to fine coagulated particles of ultrafine monoclinic zirconia crystals in which primary particles of ultrafine monoclinic zirconia crystals oriented to join into fibers of less than 50 Å diameter in the direction of C-axis are gathered in the bundle-like form of 300 to 2000 å width and 2000 to 10000 Å length, as well as a method of manufacturing them.

Since fine anisotropic particles extended in one direction are easily oriented by the external force or flowing in the molding step, they are applied to various kinds of oriented ceramics. Anisotropic zirconia particles are considered essential for providing orientation in the texture of ceramics using zirconia starting material, partially stabilized zirconia or piezoelectric or ferroelectric materials.

The present inventor has already filed patent applications regarding anisotropic zirconia particles intended for such a purpose.

One of the patent applications concerns oriented coagulated particles of zirconia type crystals prepared by subjecting an aqueous solution of a zirconium salt or a liquid suspension mixture of the aqueous solution with zirconium hydroxide to a heat treatment under an acidic condition of lower than pH 7 to form fine monoclinic zirconia crystals, then subjecting the fine crystals to a heat treatment in an aqueous strong alkali solution such as of KOH under the presence of zirconium hydroxide at a temperature of higher than 90° C. and then preferentially growing the zirconia crystals in a specific direction (refer to Japanese Patent Laid-Open No. 180917/1985).

Another of the patent applications concerns a method of preparing a sol of flaky crystalline zirconia by subjecting a water soluble zirconium salt or ultrafine crystalline zirconia obtained through hydrolysis of the salt under heating to a heat treatment in an aqueous solution containing hydrochloric acid or nitric acid at a high concentration of greater than 5N under the temperature from 120° to 250° C. for more than 50 hours (refer to Japanese Patent Laid-Open No. 201622/1986).

A further patent application concerns a method of preparing flaky zirconia type fine crystals as a layered structure of less than 500 Å thickness containing metal ions mainly composed of Zr and sulfate ions (refer to U.S. patent application Ser. No. 881,812).

The foregoing patent applications disclose anisotropic particles respectively having features different from each other and the present inventor has continued a further study and accomplished this invention based on the finding for the method of manufacturing novel fine coagulated particles of monoclinic ultrafine zirconia crystals oriented in a fiber bundle-like form.

SUMMARY OF THE INVENTION

It is, accordingly, an object of this invention to provide fine coagulated particles of ultrafine monoclinic zirconia crystals oriented in a fiber bundle-like form which are useful as the starting material for oriented ceramics.

It is another object of this invention to provide a method of manufacturing such anisotropic coagulated zirconia particles having a fiber bundle-like form.

As a result of extensive studies, the present inventor has found that novel and useful coagulated particles of ultrafine monoclinic zirconia crystals oriented in fiber bundle-like form in which primary particles of ultrafine monoclinic zirconia are oriented to join and extended in the direction of C-axis into fine fibrous form of less than 50 Å diameter and they are further gathered into a bundle-like form having from 300 to 2000 Å of width and from 2000 to 10000 Å length is obtained by applying a hydrothermal processing at a temperature from 120° to 300° C. to an acidic aqueous solution containing a water-soluble zirconium compound in an amount of from 0.1 to 2.0 mol/l as Zr, $SO_4^{2-}$ in an amount of from 0.2 to 2.0 mol/l and a water-soluble compound selected from the group consisting of water-soluble magnesium compounds, water-soluble ammonium compounds and mixtures thereof in an amount of from 0.05 to 1.5 mol/l as $Mg^{2+}$ or $NH_4^-$.

Since the anisotropic coagulated zirconia particles have not only a general aspect as oriented fine particles but also a fine fiber bundle-like form, they are easily mixed with other ceramic materials and extremely reactive and are excellent as the starting material for orienting and textures of ceramics using zirconia as the starting material, partially stabilized zirconia or piezoelectric or ferroelectric materials.

BRIEF DESCRIPTION OF THE ACCOMPANYING DRAWINGS

These and other objects, as well as features of this invention will become more apparent by reading the preferred embodiments of the invention while referring to the accompanying drawings, in which FIGS. 1 and 2 are explanatory views illustrating the profile of two typical types of coagulated fine particles of ultrafine monoclinic zirconia crystals oriented into fiber bundle-like form according to this invention.

DETAILED DESCRIPTION OF THE INVENTION

Figure 1:
Figure 2:

The fine coagulated zirconia particles according to this invention are characterized in that primary particles of ultrafine monoclinic zirconia crystals are oriented to join and extended in the direction of C-axis into fine fibrous form of less than 50 Å diameter, which are further gathered into a bundle-like form of from 300 to 2000 Å width and from 2000 to 10000 Å length. FIGS. 1 and 2 show examples of the coagulated fine zirconia particles having a fiber bundle-like form of this invention. It should be noted that the width means that of the narrowest portion "w" of the bundle-like zirconia particle in this invention. In the bundle-like zirconia particle as shown in FIG. 1, the width of the widest portion "W" is generally in a range of from 300 to 2500 Å. The ratio of the width (the narrowest width) and the length of the bundle-like zirconia particles is generally in a range of from 1:2 to 1:20, particularly from 1:5 to 1:10.

The fine coagulated particles of ultrafine monoclinic zirconia crystals oriented in a fiber bundle-like form can be synthesized by applying a hydrothermal processing to an acidic aqueous solution containing a water-soluble zirconium compound, $SO_4^{2-}$ and a water-soluble salt selected from the group consisting of water-soluble magnesium salts, water-soluble ammonium salts and mixtures thereof.

The water-soluble zirconium compound usable in this invention can include zirconium oxychloride, zirconium hydroxide, zirconium carbonate, zirconium nitrate and zirconium acetate. The zirconium compound may be used alone or in admixture of two or more. The amount of the zirconium compound should be in a range of from 0.1 to 2 mol/l, preferably from 0.2 to 1 mol/l as Zr.

The acidic aqueous solution also contains $SO_4^{2-}$ as an essential component. $SO_4^{2-}$ is usually provided from sulfuric acid. A water-soluble sulfate including magnesium sulfate, ammonium sulfate and the like is also used for providing $SO_4^{2-}$. The amount of $SO_4^{2-}$ should be in a range of from 0.2 to 2 mol/l, preferably from 0.6 to 1.5 mol/l. In this case, the amount of sulfuric acid is less than 3 molar times of Zr because it gives better results.

The water-soluble magnesium compound usable in this invention includes magnesium sulfate, magnesium hydroxide, magnesium carbonate and the like. Among them, magnesium sulfate is most preferred because it gives better results. The water-soluble ammonium compound includes ammonium sulfate, ammonium hydroxide, ammonium carbonate and the like. Among them, ammonium sulfate is most preferred. The combined use of the magnesium compound and the ammonium compound is also possible.

The amount of the magnesium compound or the ammonium compound should be in a range of from 0.05 to 1.5 mol/l, preferably 0.1~1 mol/l as $Mg^{2+}$ or $NH_4^+$. In this case, $Mg^{2+}$ or $NH_4^+$ may preferably be present so that $SO_4^{2-}$ is from 0.1 to 20 molar times, more particularly from 1 to 10 molar times of $Mg^{2+}$ or $NH_4^+$. While the coexistence of $SO_4^{2-}$ and $Mg^{2+}$ or $NH_4^+$ is indispensable, if the amount of $Mg^{2+}$ or $NH_4^+$ is excessive relative to $SO_4^{2-}$, no bundle-like form can be obtained although monoclinic zirconia can be attained. If the amount of $Mg^{2+}$ or $NH_4^+$ is insufficient, incorporation of the layered compound containing zirconia sulfate is increased.

The hydrothermal processing may be carried out at a temperature of from 120° to 300° C., preferably 140° to 230° C. and preferably in a closed container. The treating time may be in a range of 10 hours to 14 days, preferably 1 to 5 days.

The fiber bundle-like coagulated zirconia particles obtained in this invention can be separated by a usual method of separating the crystals by way of filtration and centrifugal separation, followed by drying.

The thus obtained powder can be used as the starting material for orienting the textures of ceramics using zirconia as the starting material, partially stabilized zirconia or piezoelectric or ferroelectric materials.

The present invention will further be explained more specifically referring to examples but the invention is no way limited to the following examples.

EXAMPLE 1

16 g of zirconium oxychloride ($ZrOCl_2 \cdot 8H_2O$) of reagent grade was dissolved into water and about 10 ml of concentrated aqueous ammonia were added. The resultant precipitates of hydroxides are filtered out, washed with water for once and then the precipitates were completely dissolved by adding 10 g of 36N sulfuric acid in a state where $NH_4OH$ still remained in the precipitate. The total amount of the liquid was about 200 ml and contained Zr at about 0.25 mol/l concentration, $SO_4^{2-}$ at about 0.5 mol/l concentration and $NH_4^+$ at about 0.1 mol/l concentration. The solution was tightly closed in a vessel made of polytetrafluoroethylene, heated to 150° C. in an autoclave and applied with heat treatment while being maintained for two days to obtain white precipitates.

When applying powder X-ray diffractometry for the separated and dried precipitates, it was found that all of the primary particles of ultrafine monoclinic zirconia crystals which were oriented to join and extended in the direction of C-axis into fine fibrous form of about 50 Å diameter were coagulated or gathered in a bundle-like form, as shown in FIG. 1, having the width for the narrowest portion of about 1000 Å and the length of about 8000 Å.

EXAMPLE 2

Zirconyl carbonate of reagent grade and sulfuric acid were mixed at about 1:2 molar ratio to prepare an aqueous solution containing Zr at a concentration of about 1 mol/l. According to the chemical analysis, the ratio of $Zr:SO_4^{2-}$ was 1:1.8. Aqueous ammonia was added to the aqueous solution to prepare five sample aqueous solutions each containing Zr at about 0.5 mol/l, and $NH_4^+$ at about 0.1, 0.2, 0.4, 0.6 and 0.8 mol/l respectively.

These solutions were tightly closed in a vessel made of polytetrafluoroethylene and subjected to heat treatment at 200° C. for 5 days to obtain white precipitates respectively. All of them were coagulated particles of fine monoclinic zirconia crystals having less than 50 Å diameter oriented in a fiber-bundle form, in which the coagulated particles were as shown in FIG. 2 in the case of the solutions containing $NH_4^+$ at 0.1, 0.2 and 0.4 mol/l with the width of about 700 Å and the length of about 5000 Å, whereas they were somewhat larger particles as shown in FIG. 1 in the case of containing $NH_4^+$ at 0.6 and 0.8 mol/l with the width of about 1000 Å and the length of about 7500 Å.

EXAMPLE 3

When an aqueous solution prepared by adding $Zr(OH)_4$, $(NH_4)_2SO_4$ and $H_2SO_4$ at 0.25 mol/l, 0.4 mol/l and 0.3 mol/l respectively was applied with heat treatment in an autoclave at 200° C. for 2 days in the same manner as in Example 2, the products were fine bundle-like coagulated zirconia particles having about 600 Å of width and about 2500 Å of length as shown in FIG. 2.

EXAMPLE 4

When an aqueous solution prepared by adding $Zr(OH)_4$, $MgSO_4$ and $H_2SO_4$ at a ratio of 0.5 mol/l, 0.4 mol/l and 1.5 mol/l respectively was applied with heat treatment in an autoclave at 200° C. for 3 hours in the same manner as in Example 3, the products were fine bundle-like coagulated zirconia particles having about 800 Å of width and about 5000 Å of length as shown in FIG. 2.

The primary monoclinic zirconia crystals of the bundle-like coagulated zirconia particles of Examples 3 and 4 had diameters of less than 50 Å.

What is claimed is:

1. Coagulated particles of ultrafine monoclinic zirconia crystals oriented in fiber bundle-like form, wherein primary particles of ultrafine monoclinic zirconia are oriented to join and extended in the direction of C-axis into fine fibrous form of less than 50 Å diameter and they are further gathered into a bundle-like form having from 300 to 2000 Å of width and from 2000 to 10000 Å of length.

2. A method of manufacturing coagulated particles of ultrafine monoclinic zirconia crystals oriented in fiber bundle-like form, wherein hydrothermal processing is applied at a temperature from 120° to 300° C. to an acidic aqueous solution containing a water-soluble zirconium compound in an amount of from 0.1 to 2.0 mol/l as Zr, $SO_4^{2-}$ in an amount of from 0.2 to 2.0 mol/l and a water-soluble compound selected from the group consisting of water-soluble magnesium compounds, water-soluble ammonium compounds and mixtures thereof in an amount of from 0.05 to 1.5 mol/l as $Mg^{2+}$ or $NH_4$ to obtain coagulated particles of ultrafine monoclinic zirconia crystals oriented in fiber bundle-like form, wherein primary particles of ultrafine monoclinic zirconia are oriented to join and extended in the direction of C-axis into fine fibrous form of less than 50 Å diameter and they are further gathered into a bundle-like form having from 300 to 2000 Å of width and from 2000 to 10000 Å of length.

* * * * *